United States Patent [19]

Weidmann

[11] 4,304,442

[45] Dec. 8, 1981

[54] GUIDE SYSTEM FOR A COUNTERWEIGHT

[76] Inventor: Ulrich Weidmann, Industriestrasse 13, CH-8152 Glattbrugg, Switzerland

[21] Appl. No.: 196,054

[22] PCT Filed: Jul. 16, 1979

[86] PCT No.: PCT/CH79/00100

§ 371 Date: Apr. 10, 1980

§ 102(e) Date: Apr. 9, 1980

[87] PCT Pub. No.: WO80/00298

PCT Pub. Date: Mar. 6, 1980

[30] Foreign Application Priority Data

Aug. 10, 1978 [CH] Switzerland ........................ 8517/78

[51] Int. Cl.$^3$ ............................................ F16C 29/02

[52] U.S. Cl. .................................. 308/3 R; 308/3 B; 16/198

[58] Field of Search ................. 308/3 R, 3 B; 16/194, 16/196, 219, 105

[56] References Cited

U.S. PATENT DOCUMENTS

| | | | |
|---|---|---|---|
| 2,490,652 | 12/1949 | Sahlin | 308/3 B |
| 2,795,810 | 6/1957 | Decker et al. | 16/198 |
| 3,032,377 | 5/1962 | Blase et al. | 308/3 R |
| 3,402,483 | 9/1968 | Jenny et al. | 16/105 |

*Primary Examiner*—Lenard A. Footland
*Attorney, Agent, or Firm*—Karl F. Ross

[57] ABSTRACT

The invention relates to a guide system for a counterweight that is mounted in a box-shaped profile beam, in particular for blackboards. The hollow profile beam has to this purpose on its inside longitudinal guides (17 and 18). Above and below on the counterweight (20) there are provided elastomeric bands (30) with integrally vulcanized hard-rubber elements (31) that are in light sliding contact with the longitudinal guides and that guide the counterweight during its upward and downward displacement.

6 Claims, 2 Drawing Figures

GUIDE SYSTEM FOR A COUNTERWEIGHT

The invention relates to a guide system for a counterweight that is mounted in a box-shaped profile beam, in particular for blackboard installations.

In order that a blackboard can be easily raised and lowered its weight is compensated for by a counterweight mounted in a box-shaped profile beam serving in most cases also as a guide for the blackboard. In order that the counterweight does not become canted and produce noises on being raised and lowered it must be guided in the hollow profile beam. In the guide systems known up to now rollers have usually been used which were guided in two diagonally opposite corners of the rectangular-section hollow profile beam. In such a system there are still disturbing running noises. Furthermore it necessitates a closed and relatively expensive housing which is not easy to service.

In addition it should be mentioned that the earlier often used principle of compensating for the weight of one blackboard by the weight of another blackboard is no longer considered for lecture halls. It has the disadvantage that both boards must be simultaneously moved with one board partly covering the other. A further disadvantage is that only two boards can be worked with, whereas today in high lecture halls more than two boards are employed.

The invention has the object of providing a guide system for such a counterweight which avoids the mentioned disadvantages and which is inexpensive.

The invention attains this object with a guide system that is characterized in that the box-shaped profile beam is open on one side while having two longitudinal guides on the inside of two opposite closed walls and that the counterweight mounted in the beam is surrounded at its upper and lower regions by an elastomeric annular band that is provided with integrally vulcanized hard-rubber elements in light sliding contact with the longitudinal guides.

It is preferable that the box-shaped profile beam on its back side opposite its opening has a sharp-edged longitudinally extending raised portion whose width is equal to the width of the opening on the front side because in this manner several profile beams can be fitted together to a single building unit. In lecture halls frequently two or three or more blackboards are mounted one in front of another. Only the opening of the frontmost profile beam needs to be closed with a cover. The open sides of the profile beams arranged behind it are each closed by the profile beam mounted in front of it.

In the drawing an embodiment of the invention is shown:

Figure 1:
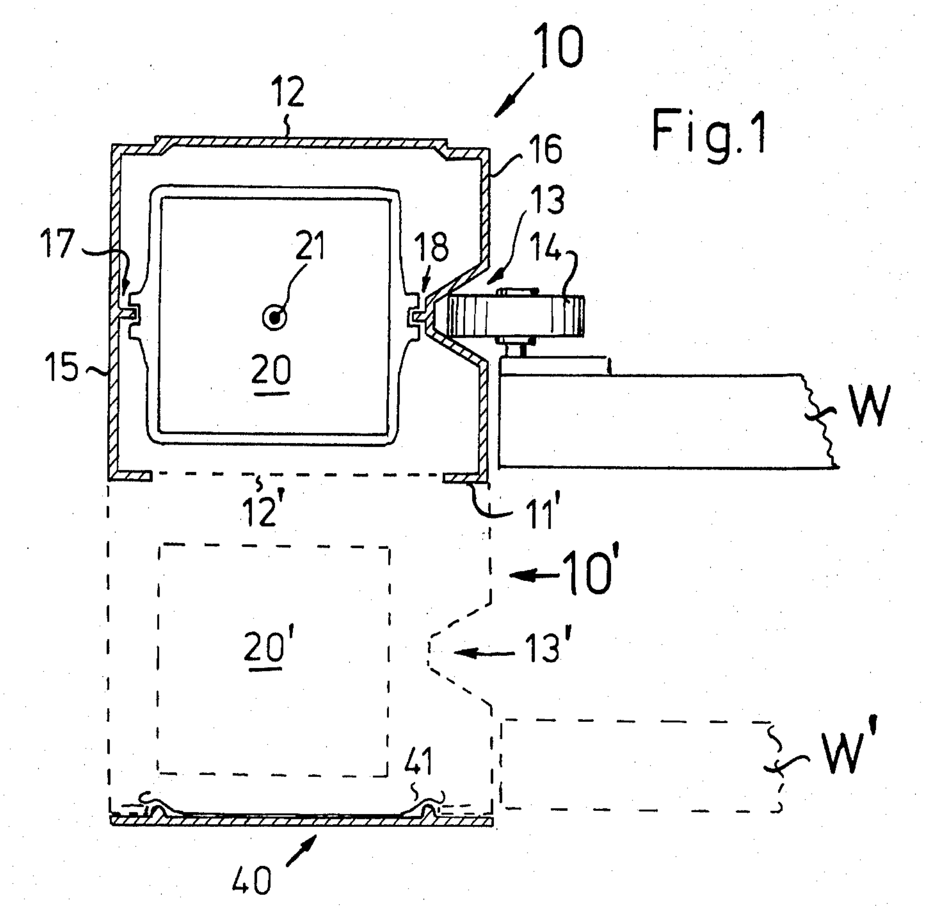
FIG. 1 shows two mounted-together profile beams with counterweights.
Figure 2:
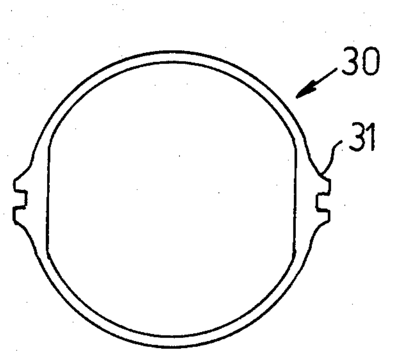
FIG. 2 shows the elastomeric band all alone.

The drawing shows a profile beam 10 with an internally guided counterweight 20 whereas the beam 10' arranged in front of it is only shown in broken lines. The profile beam has an open wall 11 with an opening that is of the same width as the sharp-edged longitudinally extending projection 12 on its rear wall. Thus the projection 12' of the beam 10' closes the opening in the wall 11 of the beam 10 and simultaneously aligns itself parallel to the beam 10.

The two blackboards W and W' are guided in V-shaped grooves 13 and 13', respectively, to which end they are fitted with rollers 14 which lie without play in the grooves 13.

On the inside of the two closed walls 15 and 16, or on the inwardly extending projections of the V-shaped grooves 13, are longitudinal ridges 17 and 18 which serve to guide the counterweight 20.

The counterweights 20 are pieces of iron of square cross section hung from the exact middle of their upper sides by a cable 21. This cable is guided upwardly to a not-illustrated sheave on which it is deflected downwardly to connection with the blackboard W. The length of this cable is such that when the blackboard is in its lowermost position the counterweight is up. The size or cross section of the counterweight is such that it can be passed easily through the opening in the wall 11 during assembly.

The cross section of the counterweight is also so selected that the two upper and lower elastomeric bands 30 surrounding the counterweight engage with their integrally vulcanized guide parts 31 when mounted on the counterweight in light gliding contact with the longitudinal ridges 17 and 18. The guide parts 31 have a generally U-shaped cross section with a widened base.

The above all has the advantage that the counterweights only need to be hung after the box-shaped profile beam has been properly mounted. Thereafter the counterweights are hung and finally the elastomeric bands with their guide parts are mounted.

The frontmost profile beam 10' has the opening in its wall 11' covered with a simple cover 40 which is held by means of snap clips 41 behind the projecting wall parts.

Finally it should be mentioned that the profile beam can have longitudinal grooves instead of the longitudinal ridges 17 and 18. Correspondingly the hard-rubber parts integrally vulcanized on the elastomeric bands have a corresponding T-shaped cross section.

I claim:

1. A guide system for a counterweight which is mounted in a box-shaped profile beam, in particular for blackboard installations, characterized in that the box-shaped profile beam (10) is open on one side while having two longitudinal guides (17 and 18) on the inside of two opposite closed walls and that the counterweight (20) mounted in the beam is surrounded at its upper and lower regions by an elastomeric annular band (30) that is provided with integrally vulcanized hard-rubber elements (31) in light sliding contact with the longitudinal guides.

2. A guide system according to claim 1, characterized in that the longitudinal guides are ridges (17 and 18) and that the hard-rubber elements (31) have a substantially U-shaped cross section receiving the ridges with play and having a broadened base.

3. A guide system according to claim 1, characterized in that the longitudinal guides are grooves and the hard-rubber elements have a substantially T-shaped cross section engaging with play in the groove.

4. A guide system according to claim 1, characterized in that the box-shaped profile beam (10) has on its side opposite its opening a sharp-edged longitudinally extending projection (12) whose width corresponds to the width of the opening on its front side (11).

5. A guide system according to claim 1, characterized in that the box-shaped profile beam has on one of its walls adjacent the open side an inwardly directed V-section guide groove (13).

6. A guide system according to claim 1, characterized in that the open wall of the box-shaped profile beam is provided with a cover (40).

* * * * *